US011853078B2

(12) United States Patent
Kawai

(10) Patent No.: US 11,853,078 B2
(45) Date of Patent: Dec. 26, 2023

(54) AUTONOMOUS WORK SYSTEM

(71) Applicant: HONDA MOTOR CO., LTD., Tokyo (JP)

(72) Inventor: Toru Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 17/511,675

(22) Filed: Oct. 27, 2021

(65) Prior Publication Data
US 2022/0137639 A1    May 5, 2022

(30) Foreign Application Priority Data

Nov. 5, 2020 (JP) .................. 2020-185350

(51) Int. Cl.
*G05D 1/02* (2020.01)
*G01S 19/48* (2010.01)
*G05D 1/00* (2006.01)

(52) U.S. Cl.
CPC .......... *G05D 1/0278* (2013.01); *G01S 19/485* (2020.05); *G05D 1/0027* (2013.01); *G05D 1/0231* (2013.01)

(58) Field of Classification Search
CPC .. G05D 1/0278; G05D 1/0027; G05D 1/0231; G01S 19/485
See application file for complete search history.

(56) References Cited

U.S. PATENT DOCUMENTS

| | | | | |
|---|---|---|---|---|
| 2012/0197519 A1* | 8/2012 | Richardson | ........ | G01C 21/3647 701/508 |
| 2016/0341557 A1* | 11/2016 | Kondo | .................... | G01S 5/017 |
| 2018/0114441 A1* | 4/2018 | Marmet | ................. | H04W 4/027 |
| 2019/0302275 A1* | 10/2019 | Tao | ......................... | G01S 19/48 |
| 2021/0263165 A1* | 8/2021 | Zheng | .................... | H04W 4/40 |
| 2022/0099843 A1* | 3/2022 | Kbayer | ................. | G01S 19/243 |
| 2022/0221587 A1* | 7/2022 | Tuck | ...................... | G01S 19/215 |

FOREIGN PATENT DOCUMENTS

| | | | | |
|---|---|---|---|---|
| EP | 3696575 A1 | * | 8/2020 | ............ G01S 19/07 |
| JP | 2017-029034 A | | 2/2017 | |
| WO | WO-2022038980 A1 | * | 2/2022 | |

OTHER PUBLICATIONS

Machine Translation of WO2022038980A1 (Year: 2022).*

\* cited by examiner

*Primary Examiner* — Rachid Bendidi
*Assistant Examiner* — Sahar Motazedi
(74) *Attorney, Agent, or Firm* — Thomas | Horstemeyer, LLP

(57) ABSTRACT

An autonomous work system comprises a plurality of autonomous work machines. The plurality of autonomous work machines each comprises: a distance specifying unit configured to specify a distance to another autonomous work machine based on image information obtained by imaging surroundings; and a communication unit configured to receive a GNSS signal of a self-machine, and GNSS signal information that has been acquired based on a GNSS signal that has been received by the another autonomous work machine and position information of the another autonomous work machine; and a position specifying unit configured to specify a self-position in a self-work area, based on the position information of the another autonomous work machine and a distance to the another autonomous work machine.

7 Claims, 8 Drawing Sheets

FIG. 8

| WORK AREA | POSITION INFORMATION OF SPECIFIC AREA |
|---|---|
| AR1 | (x11,y11)-(x12,y12) |
| AR2 | (x21,y21)-(x22,y22) |
| AR3 | (x31,y31)-(x32,y32) |
| AR4 | (x41,y41)-(x42,y42) |
| AR5 | (x51,y51)-(x52,y52) |
| AR6 | (x61,y61)-(x62,y62) |
| AR7 | (x71,y71)-(x72,y72) |
| AR8 | (x81,y81)-(x82,y82) |
| AR9 | (x91,y91)-(x92,y92) |

AUTONOMOUS WORK SYSTEM

CROSS-REFERENCE TO RELATED APPLICATION(S)

This application claims priority to and the benefit of Japanese Patent Application No. 2020-185350 filed on Nov. 5, 2020, the entire disclosure of which is incorporated herein by reference.

BACKGROUND OF THE INVENTION

Field of the Invention

The present invention relates to an autonomous work system including a plurality of autonomous work machines that respectively work in different work areas.

Description of the Related Art

Japanese Patent Laid-Open No. 2017-029034 discloses a configuration of a work vehicle that acquires position information, based on a GNSS signal from a GNSS satellite.

However, in an autonomous work machine that performs autonomous work by specifying the position information using a GNSS signal (GNSS signal: Global Navigation Satellite System signal), in a case where the GNSS signal cannot be received or in a case where signal strength of the GNSS signal that has been acquired based on the GNSS signal, orbit information of a positioning satellite included in the GNSS signal, and time information of an atomic clock (hereinafter, referred to as "GNSS signal information") does not satisfy predetermined allowable accuracy of signal information to be a reference (hereinafter, referred to as "reference signal information"), position specifying accuracy for specifying its self-position in the work area may decrease.

The present invention has been made in view of the above problems, and provides an autonomous work technique capable of specifying a self-position, based on position information of another autonomous work machine that has received a GNSS signal having GNSS signal information that satisfies allowable accuracy and a distance to such another autonomous work machine, in a case where the GNSS signal information that has been acquired based on the GNSS signal that has been received by the self-machine does not satisfy predetermined allowable accuracy of reference signal information.

SUMMARY OF THE INVENTION

According to one aspect of the present invention, there is provided an autonomous work system comprising a plurality of autonomous work machines, the plurality of autonomous work machines each comprising: a distance specifying unit configured to specify a distance to another autonomous work machine based on image information obtained by imaging surroundings; and a communication unit configured to receive a GNSS signal of a self-machine, and GNSS signal information that has been acquired based on a GNSS signal that has been received by the another autonomous work machine and position information of the another autonomous work machine that has been acquired based on the GNSS signal information; and a position specifying unit configured to, in a case where the GNSS signal information that has been acquired based on the GNSS signal of the self-machine does not satisfy predetermined allowable accuracy of reference signal information, specify a self-position in a self-work area, based on the position information of the another autonomous work machine that has received the GNSS signal having the GNSS signal information that satisfies the allowable accuracy of the reference signal information and a distance to the another autonomous work machine.

BRIEF DESCRIPTION OF THE DRAWINGS

The accompanying drawings illustrating an embodiment of the present invention constitute part of the specification, and are used together with the description to describe the present invention.

FIG. 8 is a diagram illustrating a state in which position information of a specific area is stored in a storage unit.

DESCRIPTION OF THE EMBODIMENTS

Figure 1:
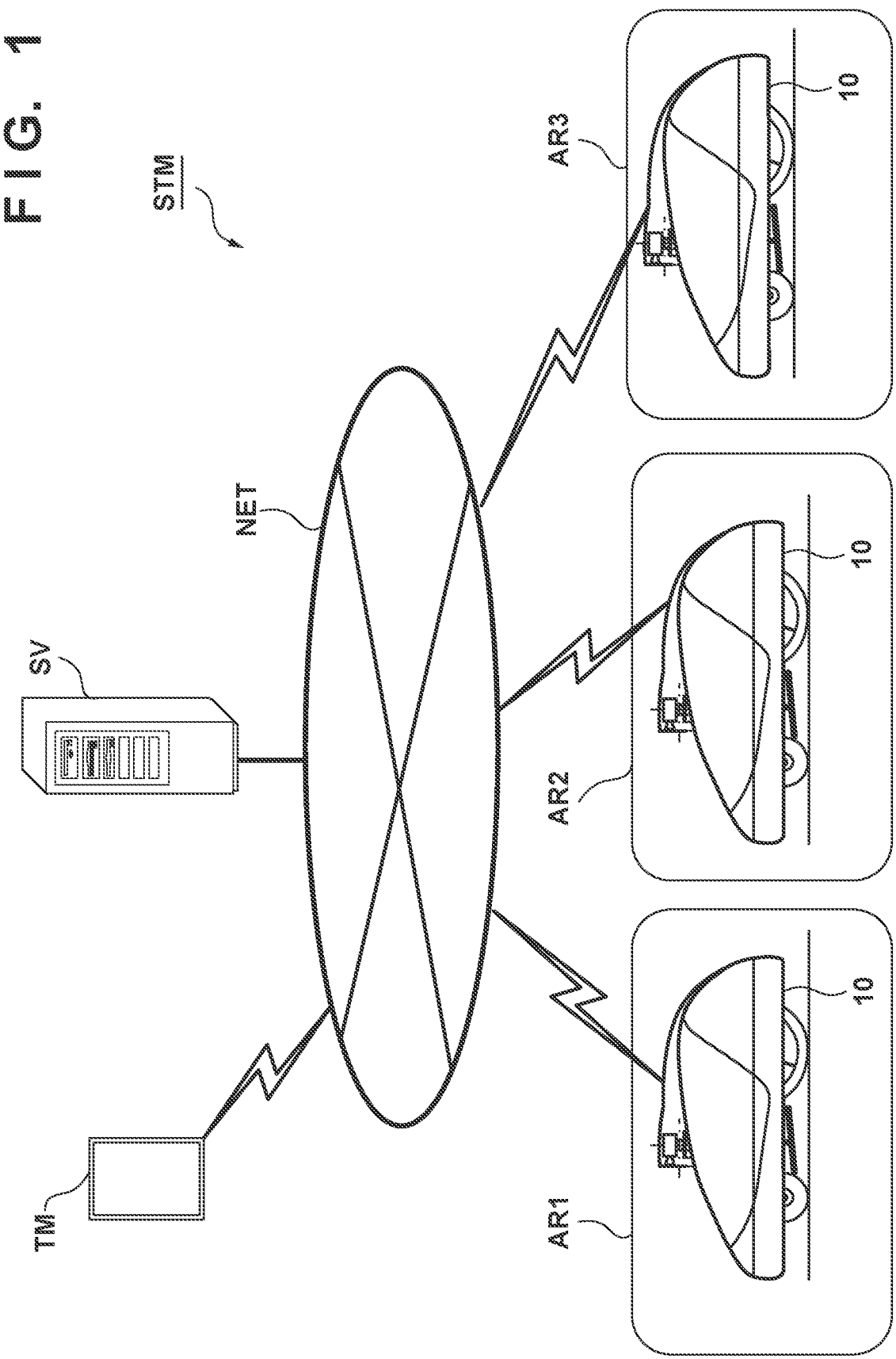
FIG. 1 schematically illustrates an overview of an autonomous work system according to a first embodiment.

Hereinafter, embodiments will be described in detail with reference to the accompanying drawings. Note that the following embodiments do not limit the invention according to the claims, and not all combinations of features described in the embodiments are essential to the invention. Two or more of a plurality of the features described in the embodiments may be optionally combined together. In addition, the same or similar constituent elements are denoted by the same reference numerals, and overlapping descriptions will be omitted.

First Embodiment (Overview of Autonomous Work System)

FIG. 1 schematically illustrates an overview of an autonomous work system according to a first embodiment. An autonomous work system STM includes a plurality of autonomous work machines 10 that respectively work in different work areas, and a control apparatus (SV, TM) capable of controlling each of the autonomous work machines by communicating with the plurality of autonomous work machines 10. The control apparatus includes an information processing apparatus SV and a mobile information terminal apparatus TM such as a smartphone that are operable by a user. The information processing apparatus SV and the information terminal apparatus TM are configured to be communicable with each of the autonomous work machines 10 through a network NET. Note that the CPU of each of the autonomous work machines 10 is also capable of performing the processes of the control apparatus (the information processing apparatus SV and the information terminal apparatus TM).

In FIG. 1, the autonomous work machines 10 are respectively located in different work areas AR1, AR2, AR3, and so on. The control apparatus (SV, TM) is capable of generating schedules for work performed in the respective work areas, based on an operation input by a user, and is capable of controlling the autonomous work machines 10 based on schedules that have been generated. The autonomous work machine 10 performs work in accordance with the generated schedule, while traveling autonomously within the work area.

The autonomous work machines 10 can each function as, for example, a lawn mower, a snow blower, or a cultivator that works while traveling autonomously within the work area. However, these are merely examples of the autonomous work machine, and thus the present invention is also applicable to other types of work machines. In the following description, a first embodiment of the present invention will be described with a configuration of a lawn mower as an example.

(Overview of Autonomous Work Machine)

Figure 2:
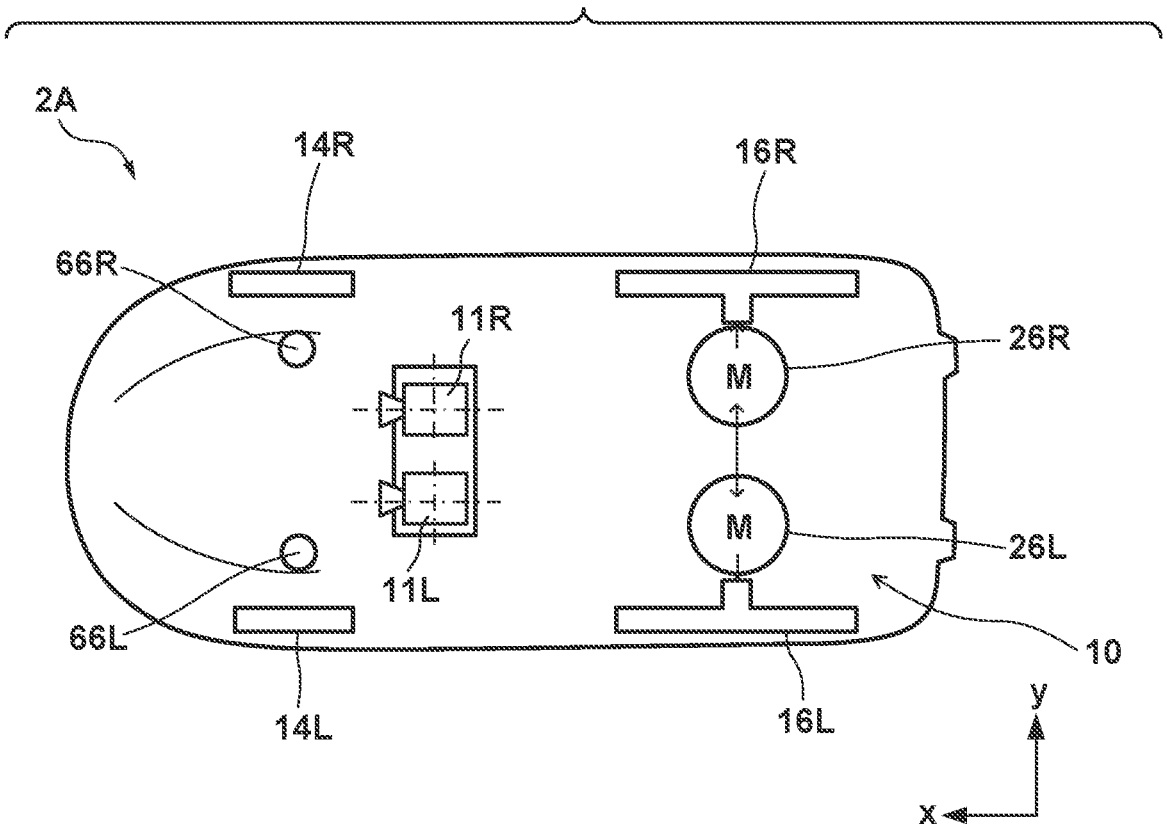
FIG. 2 is a schematic top view of an autonomous work machine according to an embodiment.
Figure 2:
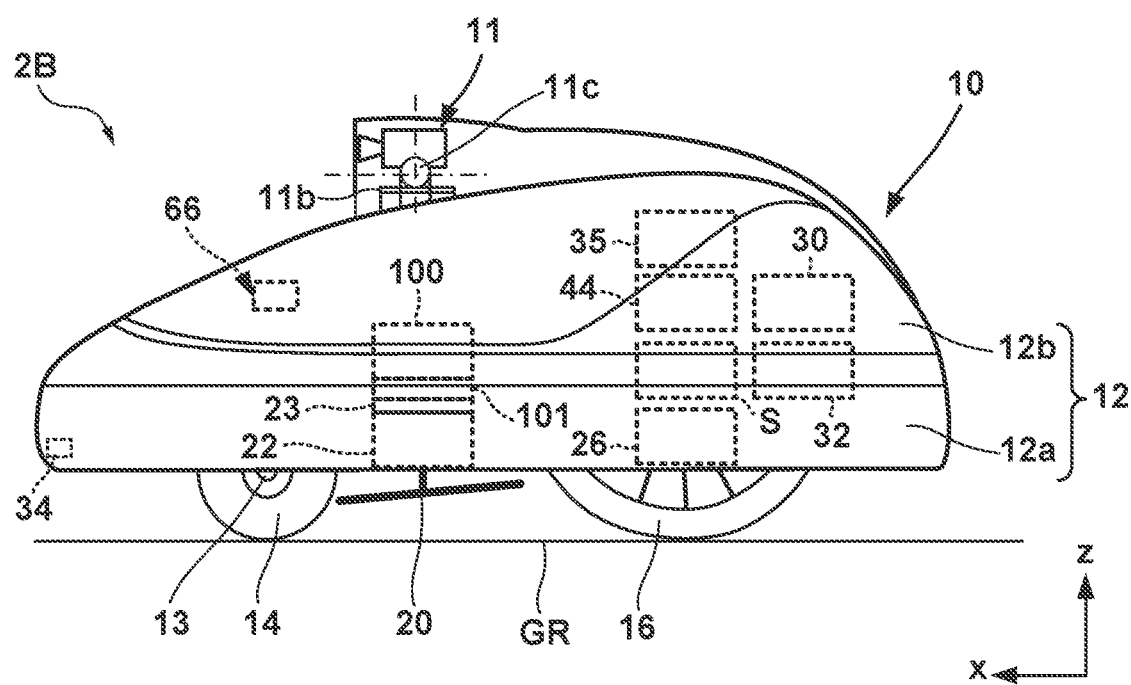

Reference numeral 2A in FIG. 2 is a schematic top view of an autonomous work machine 10 according to the first embodiment. Reference numeral 2B in FIG. 2 is a schematic side view of the autonomous work machine 10. Hereinafter, a moving direction (vehicle length direction: x direction), a lateral direction (vehicle width direction: y direction) orthogonal to the moving direction, and a vertical direction (z direction) orthogonal to the moving direction and the lateral direction in a side view of the autonomous work machine are respectively defined as a front-and-rear direction, a left-and-right direction (horizontal direction), and an up-and-down direction. The configuration of each part will be described in accordance with the above definition.

As illustrated in FIGS. 2A and 2B, the autonomous work machine 10 includes a camera 11, a vehicle body 12, a stay 13, front wheels 14, rear wheels 16, a blade 20, a work motor 22, a motor holding member 23, a blade height adjustment unit 100, and a translation mechanism 101. The autonomous work machine 10 further includes a travel motor 26, a group of various sensors S, an electronic control unit (ECU) 44, a charging unit 30, a battery 32, a charging terminal 34, and a notification unit 35.

The camera 11 that images the external field of the autonomous work machine 10 includes a plurality of cameras (a left camera 11L, a right camera 11R) capable of imaging a situation around the autonomous work machine 10. The ECU 44 is capable of acquiring information of the external field of the autonomous work machine 10 from the camera 11. The camera 11 is capable of imaging ahead of the autonomous work machine 10, or a range of 360 degrees as an imaging range. The camera 11 (the left camera 11L, the right camera 11R) is held by a pan-angle adjustment mechanism 11b that adjusts an angle in the horizontal direction (0° to 360°) and a tilt-angle adjustment mechanism 11c that adjusts an angle in the up-and-down direction. The ECU 44 controls at least one of the pan-angle adjustment mechanism 11b and the tilt-angle adjustment mechanism 11c, and is capable of controlling the angle of the camera 11.

The vehicle body 12 of the autonomous work machine 10 includes a chassis 12a, and a frame 12b attached to the chassis 12a. The front wheels 14 include one left wheel and one right wheel (a left front wheel 14L and a right front wheel 14R) each having a smaller diameter and fixed to the front of the chassis 12a through the stay 13 in the front-and-rear direction. The rear wheel 16 includes one left wheel and one right wheel (a left rear wheel 16L and a right rear wheel 16R) each having a larger diameter and attached to the rear of the chassis 12a.

The blade 20 is a rotary blade for lawn mowing work, and is attached near the central position of the chassis 12a. The work motor 22 is an electric motor disposed above the blade 20. The blade 20 is connected with the work motor 22, and is rotatably driven by the work motor 22. The motor holding member 23 holds the work motor 22. The motor holding member 23 is restricted in rotation with respect to the chassis 12a, and is allowed to move in the up-and-down direction by, for example, the combination of a guide rail and a slider movable up and down while being guided by the guide rail.

The blade height adjustment unit 100 is a motor for adjusting the height in the up-and-down direction of the blade 20 with respect to a ground surface GR. The translation mechanism 101 is connected with the blade height adjustment unit 100, and is a mechanism for converting the rotation of the blade height adjustment unit 100 into a translational movement in the up-and-down direction. The translation mechanism 101 is also connected with the motor holding member 23 that holds the work motor 22.

The rotation of the blade height adjustment unit 100 is converted into the translational movement (movement in the up-and-down direction) by the translation mechanism 101, and the translational movement is transmitted to the motor holding member 23. Due to the translational movement (movement in the up-and-down direction) of the motor holding member 23, the work motor 22 that is held by the motor holding member 23 is also subject to the translational movement (moves in the up-and-down direction). Due to the movement in the up-and-down direction of the work motor 22, the height of the blade 20 with respect to the ground surface GR is adjustable.

The travel motor 26 includes two electric motors (prime movers) (a left travel motor 26L and a right travel motor 26R) attached to the chassis 12a of the autonomous work machine 10. The two electric motors are connected one-to-one to the left and right rear wheels 16. Independent rotation of the left and right wheels forward (rotation in the forward direction) or rearward (rotation in the rearward direction) with the front wheel 14 as a driven wheel and the rear wheel 16 as a drive wheel allows the autonomous work machine 10 to move in various directions.

The charging terminal 34 is a charging terminal provided at a front end position in the front-and-rear direction of the frame 12b, and is connected with the corresponding charging terminal of a charging station to receive the electric power supplied from the charging station. The charging terminal 34 is connected with the charging unit 30 through wiring, and the charging unit 30 is connected with the battery 32. In addition, the work motor 22, the travel motor 26, and the blade height adjustment unit 100 are also connected with the battery 32, and are configured to be supplied with the electric power from the battery 32.

The ECU 44 is an electronic control unit including a microcomputer configured on a circuit board, and controls the operation of the autonomous work machine 10. The details of the ECU 44 will be described later. In a case where an abnormality occurs in the autonomous work machine 10, the notification unit 35 issues a notification of the occurrence of the abnormality. For example, the notification can be issued with voice or display. Alternatively, the occurrence of the abnormality can be output to external equipment wirelessly connected with the autonomous work machine 10. A user is able to learn the occurrence of the abnormality through the external equipment.

(Control Block Diagram)

Figure 3:
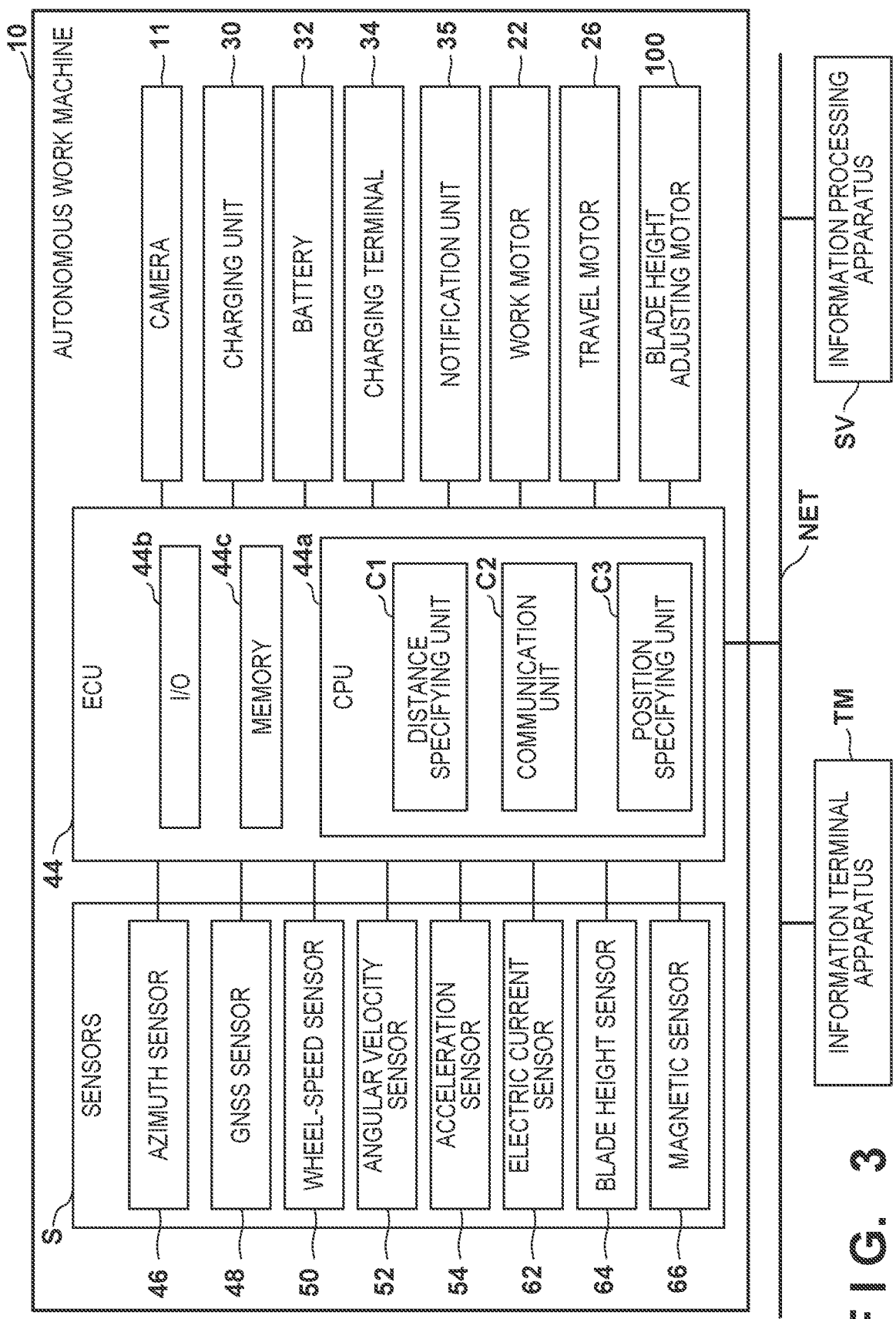
FIG. 3 is a block diagram illustrating relationships between inputs and outputs of an electronic control unit (ECU) that controls the autonomous work machine according to an embodiment.

FIG. 3 is a block diagram illustrating relationships between inputs and outputs of the electronic control unit (ECU) that controls the autonomous work machine 10. As illustrated in FIG. 3, the ECU 44 includes a CPU 44a, an I/O 44b, and a memory 44c. The memory 44c functions as a storage unit, and is configured with a read only memory (ROM), an electrically erasable programmable read only memory (EEPROM), a random access memory (RAM), or the like.

The memory 44c stores information regarding a work timetable (schedule) and a work area of the autonomous work machine 10, various programs for controlling the operation of the autonomous work machine 10, and an area map indicating the shape of the work area. The autonomous work machine 10 is capable of performing predetermined work, while traveling autonomously within the work area, based on the area map of the work area.

The CPU 44a reads and executes a program stored in the memory 44c so as to operate as each processing unit for achieving the present invention. As a functional configuration of each processing unit for achieving the present invention, the CPU 44a includes a distance specifying unit C1, a communication unit C2, and a position specifying unit C3.

The distance specifying unit C1 specifies a distance to an object (for example, another autonomous work machine) present in the surroundings based on image information obtained by imaging the surroundings with the camera 11. The distance specifying unit C1 is capable of acquiring information of the external field of the autonomous work machine 10 from the camera 11, and is capable of calculating and specifying distance information between an object present in the surroundings and the autonomous work machine 10 (self-machine), based on the image information that has been imaged by the camera 11 (the left camera 11L, the right camera 11R) having parallax between the plurality of cameras. Here, the object present in the surroundings includes, for example, a plurality of other autonomous work machines that respectively work in other work areas different from the work area in which the autonomous work machine 10 (self-machine) performs the work (hereinafter, "self-work area").

The distance specifying unit C1 is capable of further specifying the distances to the plurality of other autonomous work machines 10, a marker distance to a marker at which the boundary of the self-work area is defined and position information in the self-work area is set, and a distance to a base station, based on the image information imaged by the camera 11 (the left camera 11L, the right camera 11R).

The communication unit C2 controls communication with the outside via the I/O 44b. The communication unit C2 performs a process of receiving a GNSS signal that has been received from a base station or a positioning satellite, for example. Further, the communication unit C2 is capable of controlling bidirectional communication with the control apparatus (the information processing apparatus SV and the information terminal apparatus TM) functioning as a server. The communication unit C2 receives the GNSS signal information that has been acquired based on the GNSS signal that has been received by another autonomous work machine 10 and position information of another autonomous work machine 10 that has been acquired based on the GNSS signal information, via the control apparatus (the information processing apparatus SV and the information terminal apparatus TM).

Further, the communication unit C2 is capable of controlling bidirectional communication with another autonomous work machine 10 present in the surroundings. Through the communication with another autonomous work machine 10, the communication unit C2 is capable of receiving the GNSS signal information that has been acquired based on the GNSS signal that has been received by another autonomous work machine 10 and the position information of another autonomous work machine that has been acquired based on the GNSS signal information.

In addition, the communication unit C2 is capable of transmitting, to the outside (the control apparatus, another autonomous work machine), the GNSS signal information that has been acquired based on the received GNSS signal of the self-machine and the position information in the self-work area where the autonomous work machine 10 (self-machine) performs the work based on the GNSS signal information. Accordingly, the GNSS signal information and the position information can be transmitted and received between the plurality of autonomous work machines 10.

The position specifying unit C3 specifies the self-position (position coordinates on map data for specifying the work area) in the self-work area where the self-machine performs the work. In the self-work area, in a case where the GNSS signal information that has been acquired based on the GNSS signal of the self-machine that has been received via the communication unit C2 satisfies allowable accuracy of the reference signal information, the position specifying unit C3 specifies the self-position, based on the GNSS signal information that has been acquired based on the received GNSS signal of the self-machine.

In addition, in a case where the GNSS signal information that has been acquired based on the GNSS signal of the self-machine that has been received by the communication unit C2 does not satisfy the predetermined allowable accuracy of the reference signal information, the position specifying unit C3 specifies the self-position in the self-work area, based on the position information of another autonomous work machine that has received the GNSS signal having the GNSS signal information that satisfies the allowable accuracy of the reference signal information and the distance to such another autonomous work machine 10.

The memory 44c (the storage unit) stores a specific area in which the GNSS signal information does not satisfy the predetermined allowable accuracy of the reference signal information (exceeds the predetermined allowable accuracy) in each work area. The specific area is, for example, an area in which it is difficult to stably receive the GNSS signal due to the presence of a shielding object that shields radio waves or a relative positional relationship with the base station, and is an area in which the positional accuracy based on the GNSS signal is likely to decrease. FIG. 8 is a diagram illustrating a state in which position information of the specific area in which the GNSS signal information does not satisfy the predetermined allowable accuracy of the reference signal information is stored in the storage unit, and the position information of the specific area is set for each of the work areas (AR1 to AR9). The position information of the specific area can be downloaded from, for example, the control apparatus (the information processing apparatus SV and the information terminal apparatus TM) and set in the memory 44c (the storage unit).

When the autonomous work machine 10 (self-machine) enters the specific area, the position specifying unit C3 specifies the self-position based on the position information that has been received from another autonomous work machine 10 and the distance to such another autonomous work machine 10. The position specifying unit C3 specifies the self-position based on the position information that has been received from at least two other autonomous work machines 10 and the distances to such other autonomous work machines 10.

For example, in a case where the position information of the two other autonomous work machines 10 is used, the position specifying unit C3 is capable of specifying the self-position, based on the respective pieces of position information (xm, ym) and (xn, yn) and distances Lm and Ln to the two other autonomous work machines 10 from the autonomous work machine 10 (self-machine). The specifying method may be based on triangulation, and it is also possible to use an angle formed by a direction of another autonomous work machine 10 having the position information (xm, ym) with respect to the autonomous work machine 10 (self-machine) and a direction of another autonomous work machine 10 having the position information (xn, yn).

In specifying the self-position, it is also possible to use, for example, another autonomous work machine 10, the distance to such another autonomous work machine 10, and a distance (a marker distance) to a marker at which the position information in the self-work area is set, without using the information of the two other autonomous work machines. That is, the position specifying unit C3 is also capable of specifying the self-position, based on the position information that has been received from another autonomous work machine, the distance to such another autonomous work machine, the position information of the marker, and the marker distance.

The ECU 44 is connected with the group of various sensors S. The group of various sensors S includes an azimuth sensor 46, a GNSS sensor 48, a wheel-speed sensor 50, an angular velocity sensor 52, an acceleration sensor 54, an electric current sensor 62, a blade height sensor 64, a magnetic sensor 66, and the like.

The GNSS sensor 48 and the azimuth sensor 46 are sensors for acquiring information of a position and an orientation of the autonomous work machine 10. The azimuth sensor 46 detects azimuth in accordance with terrestrial magnetism. The GNSS sensor 48 receives radio waves (GNSS signals) that have been transmitted from a base station or a positioning satellite, and detects information indicating the current position (latitude, longitude) of the autonomous work machine 10.

The wheel-speed sensor 50, the angular velocity sensor 52, and the acceleration sensor 54 are sensors for acquiring information regarding a movement state of the autonomous work machine 10. The wheel-speed sensor 50 detects the wheel speeds of the left and right rear wheels 16. The angular velocity sensor 52 detects an angular velocity around the axis in the up-and-down direction (z axis in the vertical direction) at the position of the center of gravity of the autonomous work machine 10. The acceleration sensor 54 detects accelerations in the 3 orthogonally triaxial directions of x, y, and z axes acting on the autonomous work machine 10.

The electric current sensor 62 detects electric current consumption (an amount of electric power consumption) of the battery 32. A detection result of the electric current consumption (the amount of electric power consumption) is stored in the memory 44c of the ECU 44. In a case where a predetermined amount of electric power is consumed and the amount of electric power stored in the battery 32 becomes equal to or less than a threshold value, the ECU 44 controls the autonomous work machine 10 to return to a charging station for charging.

The blade height sensor 64 detects a height of the blade 20 with respect to the ground surface GR. A detection result of the blade height sensor 64 is output to the ECU 44. The blade height adjustment unit 100 is driven, based on the control by the ECU 44, and the blade 20 moves up and down in the up-and-down direction, so as to adjust the height from the ground surface GR.

The magnetic sensor 66 (a left magnetic sensor 66L, a right magnetic sensor 66R) disposed at symmetrical positions in the left-and-right direction of the autonomous work machine 10, and detects a magnetic field generated at an area wire, and outputs a signal indicating the strength of each magnetic field (intensity of the magnetic field) to the ECU 44.

Outputs from the group of various sensors S are input into the ECU 44 through the I/O 44b. The ECU 44 causes the battery 32 to supply the travel motor 26, the work motor 22, and the blade height adjustment unit 100 with the electric power, based on the outputs from the group of various sensors S. The ECU 44 outputs a control value through the I/O 44b to control the travel motor 26, so as to control traveling of the autonomous work machine 10. In addition, the ECU 44 also outputs a control value through the I/O 44b to control the blade height adjustment unit 100, so as to adjust the height of the blade 20. Further, the ECU 44 outputs a control value through the I/O 44b to control the work motor 22, so as to control the rotation of the blade 20. Here, the I/O 44b is capable of functioning as a communication interface, so that the communication unit C2 is capable of wirelessly communicating with the control apparatus (the information processing apparatus SV, the information terminal apparatus TM) through the I/O 44b on the network NET.

The control apparatus (the information processing apparatus SV, the information terminal apparatus TM) receives GNSS signal information that has been transmitted from a plurality of autonomous work machines 10 that respectively perform the work in different work areas and position information based on the GNSS signal information. The position information indicates position information in a work area where each of the plurality of autonomous work machines performs the work. Then, the control apparatus sets an autonomous work machine as a transmission destination, except for an autonomous work machine that is a transmission source among the plurality of autonomous work machines, and transmits the GNSS signal information and the position information that have been received from the transmission source to the autonomous work machine that has been set as the transmission destination. Accordingly, the GNSS signal information and the position information can be shared among the plurality of autonomous work machines 10 that respectively perform the work in different work areas.

(Example of a Plurality of Autonomous Work Machines that Respectively Perform Work in Different Work Areas)

Figure 4:
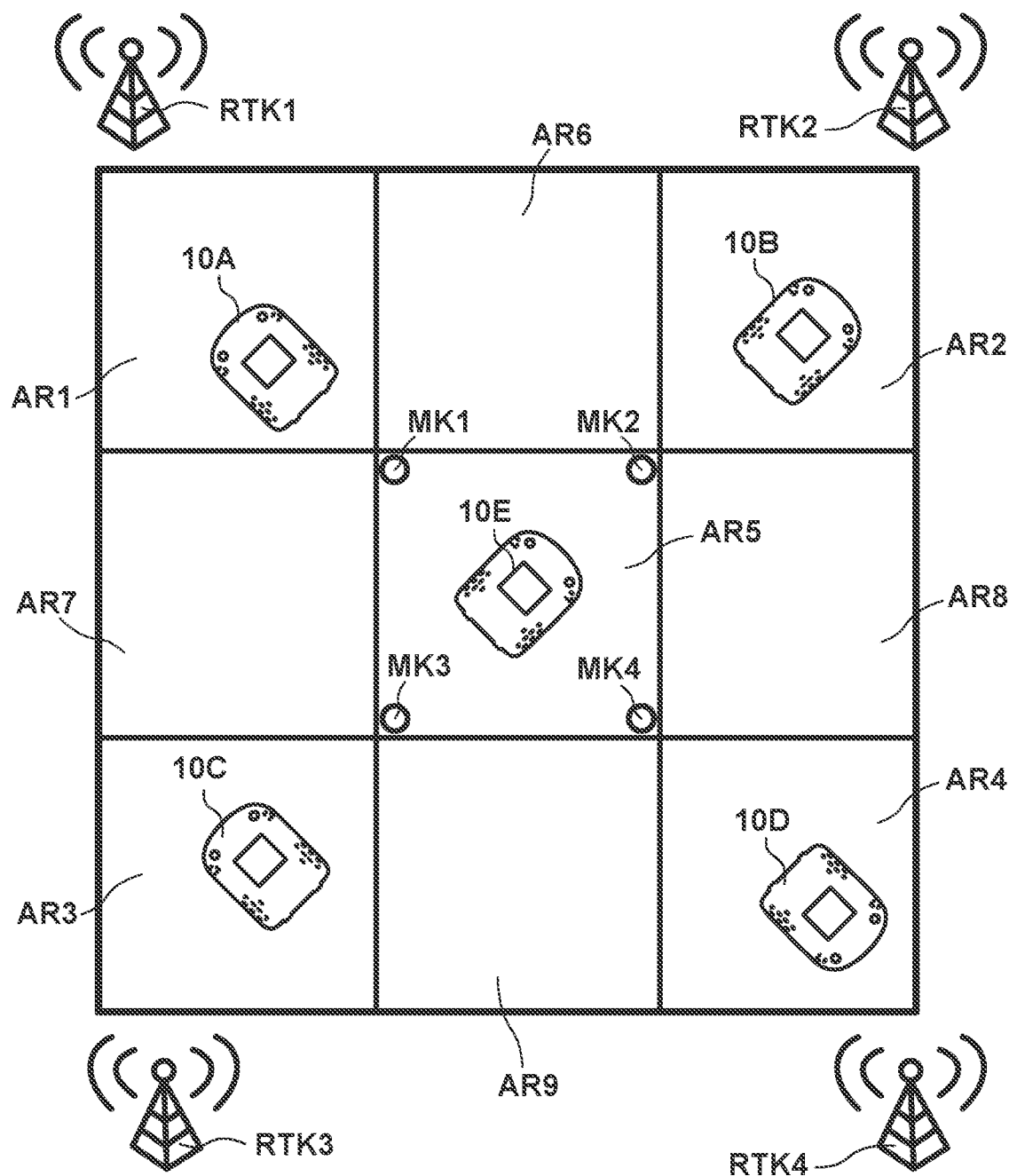
FIG. 4 is a schematic diagram illustrating a plurality of autonomous work machines that respectively work in different work areas.

FIG. 4 is a schematic diagram illustrating a plurality of autonomous work machines that respectively perform work in different work areas, and here illustrates an example in which AR1 to AR9 are set as the different work areas. The autonomous work machines 10A to 10E are autonomous work machines that respectively work in the work areas AR1 to AR5.

The work area AR1 is a work area close to a base station RTK1 that transmits the GNSS signals, and the work area AR2 is a work area close to a base station RTK2 that transmits the GNSS signals. The work area AR3 is a work area close to a base station RTK3 that transmits the GNSS signals, and the work area AR4 is a work area close to a base station RTK4 that transmits the GNSS signals.

Regarding each of the work areas AR1 to AR9, a user optionally partitions the work areas or partitions the work areas by an area wire. Before performing the work in the work area AR that has been assigned, the ECU 44 of the autonomous work machine 10 recognizes the area based on map information that has been set by the user or the map information based on the GNSS signal. In a case where the area wire is set, trace traveling is conducted along the outer periphery of the work area AR based on the detection result of the area wire, so as to recognize (grasp) the boundary of the work area AR. An area map indicating the outer shape of the work area is generated by the trace traveling. The area map that has been generated is stored in the memory 44c (the storage unit). The autonomous work machine 10 autonomously travels in the work area AR in accordance with the area map that has been generated, and perform predetermined work. A marker, a base station, or the like may be installed, in addition to the area wire, depending on demanded work accuracy.

As illustrated in FIG. 4, the work area AR5 at the central part is a work area at a position farther from the GNSS base stations RTK1 to RTK4 than the work areas AR1 to AR4. In taking a process of the autonomous work machine 10E that works in the work area AR5 as an example, the position specifying unit C3 of the autonomous work machine 10E specifies the self-position in the self-work area AR5 where the autonomous work machine 10 (self-machine) performs the work.

In the self-work area AR5, in a case where the GNSS signal information that has been acquired based on the GNSS signals of the self-machine that have been received from the plurality of base stations (for example, at least two base stations of the base stations RTK1 to RTK4) via the communication unit C2 satisfies the allowable accuracy of the reference signal information, the position specifying unit C3 specifies the self-position based on the GNSS signal information that has been acquired based on the received GNSS signals of the self-machine. On the other hand, in a case where the GNSS signal information that has been acquired based on the GNSS signals of the self-machine that have been received by the communication unit C2 does not satisfy the predetermined allowable accuracy of the reference signal information, the position specifying unit C3 specifies the self-position in the self-work area based on the position information of other autonomous work machines (for example, at least two of the autonomous work machines 10A to 10D) that have received the GNSS signals having the GNSS signal information that satisfies the allowable accuracy of the reference signal information and the distances to such other autonomous work machines (for example, the distances from the autonomous work machine 10 (self-machine) to other autonomous work machines 10A and 10B).

(Process of Autonomous Work System)

Figure 5:
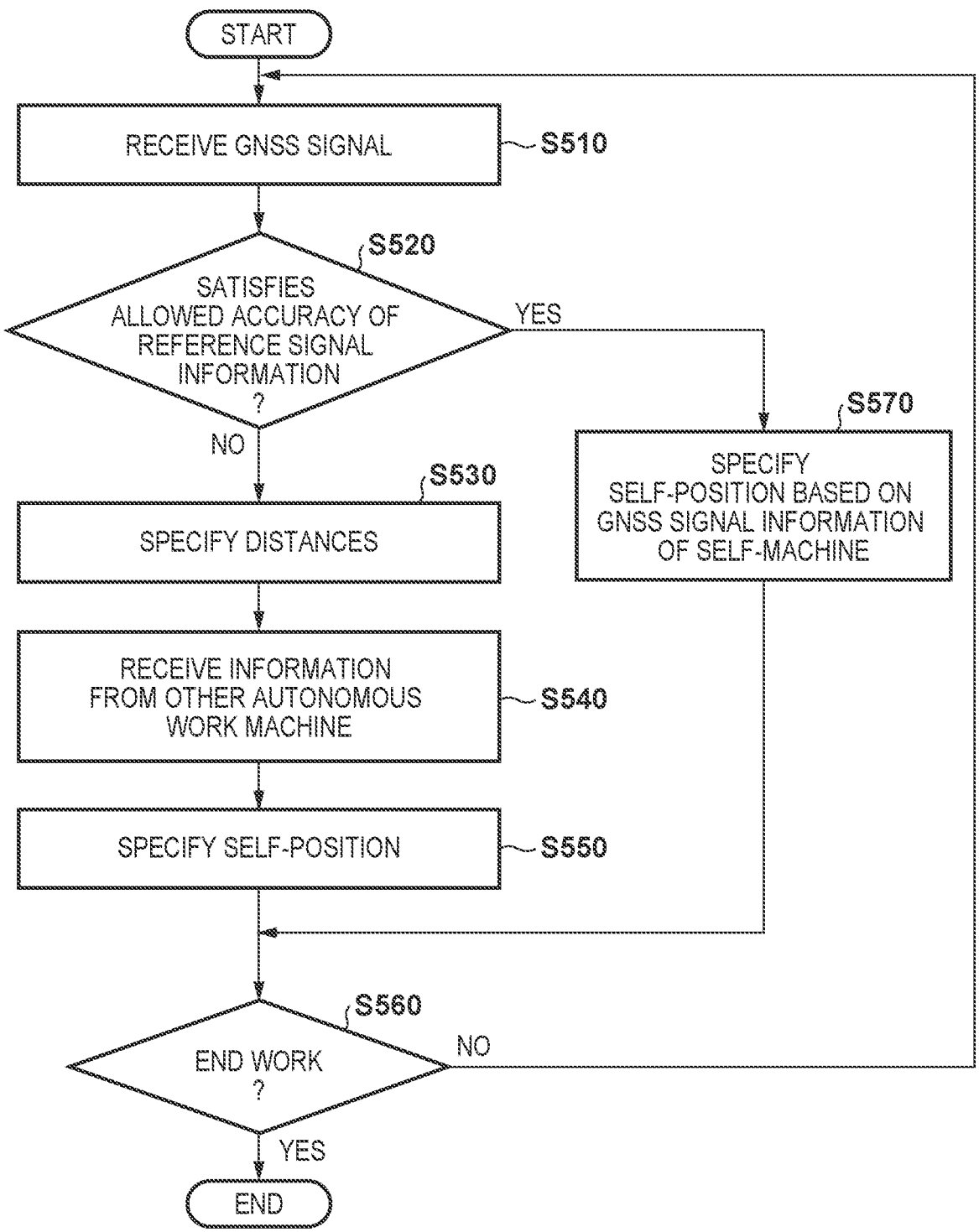
FIG. 5 is a flowchart for describing a process of the autonomous work system according to the first embodiment.

FIG. 5 is a flowchart for describing a process of the autonomous work system according to the first embodiment. First, in step S510, the GNSS sensor 48 receives the GNSS signal that has been transmitted from a base station or a positioning satellite.

In step S520, the position specifying unit C3 compares the GNSS signal information that has been acquired based on the GNSS signal with the reference signal information. In a case where the GNSS signal information satisfies predetermined allowable accuracy of the reference signal information (S520—Yes), the process proceeds to step S570, and the position specifying unit C3 specifies the self-position based on the GNSS signal information that has been acquired based on the received GNSS signal of the self-machine (S570).

Here, the GNSS signal information is information acquired based on the GNSS signal that has been received, and includes signal strength of the GNSS signal, orbit information of a positioning satellite included in the GNSS signal, and time information of an atomic clock. In addition, the reference signal information is signal information serving as a reference (a threshold value), and is set beforehand for each of the signal strength of the GNSS signal, the orbit information of the positioning satellite, and the time information of the atomic clock included in the GNSS signal information. In a case where the respective pieces of information such as the signal strength of the GNSS signal, the orbit information of the positioning satellite, and the time information of the atomic clock satisfy the predetermined allowable accuracy in the reference signal information, the position specifying unit C3 specifies the self-position based on the GNSS signal information that has been acquired from the received GNSS signal of the self-machine (S570). Note that, regarding the method of determining whether the information of the satellite signal satisfies the accuracy to be the reference as described above, various known methods are applicable.

On the other hand, in the comparison process of step S520, in a case where the GNSS signal information that has been acquired based on the GNSS signal of the self-machine does not satisfy the predetermined allowable accuracy of the reference signal information (S520—No), the process proceeds to step S530. That is, in a case where at least one of the signal strength of the GNSS signal, the orbit information of the positioning satellite, and the time information of the atomic clock does not satisfy the predetermined allowable accuracy in the reference signal information (exceeds the predetermined allowable accuracy), the process proceeds to step S530.

In step S530, the distance specifying unit C1 specifies the distances to the plurality of other autonomous work machines 10, based on the image information that has been imaged by the camera 11.

In step S540, the communication unit C2 receives the GNSS signal information that has been acquired based on the GNSS signal that has been received by another autonomous work machine 10 and the position information of another autonomous work machine 10 that has been acquired based on the GNSS signal information via the control apparatus (the information processing apparatus SV and the information terminal apparatus TM). Note that without the intervention of the control apparatus (the information processing apparatus SV and the information terminal apparatus TM), the GNSS signal information that has been acquired based on the GNSS signal that has been received by another autonomous work machine 10 and the position information of another autonomous work machine 10 that has been acquired based on the GNSS signal information can be directly received through mutual communication between the autonomous work machines 10.

Then, in step S550, the position specifying unit C3 specifies the self-position in the self-work area, based on the position information of such another autonomous work machine that has received the GNSS signal having the GNSS signal information that satisfies the allowable accuracy of the reference signal information and the distance to such another autonomous work machine.

Then, in a case of continuing the work in the determination in step S560 (S560—No), the process returns to step S510, and a similar process is repeatedly performed. On the other hand, in a case of ending the work (S560—Yes), the process of FIG. 5 ends.

Second Embodiment

In the process of FIG. 5, the description has been given with regard to an example of performing the process in accordance with a determination result as to whether the GNSS signal information that has been acquired based on the GNSS signal satisfies the allowable accuracy of the reference signal information. However, the process can also be performed in accordance with the determination result as to whether the distance between the autonomous work machine 10 (self-machine) and the base station is equal to or greater than a threshold value.

Figure 6:
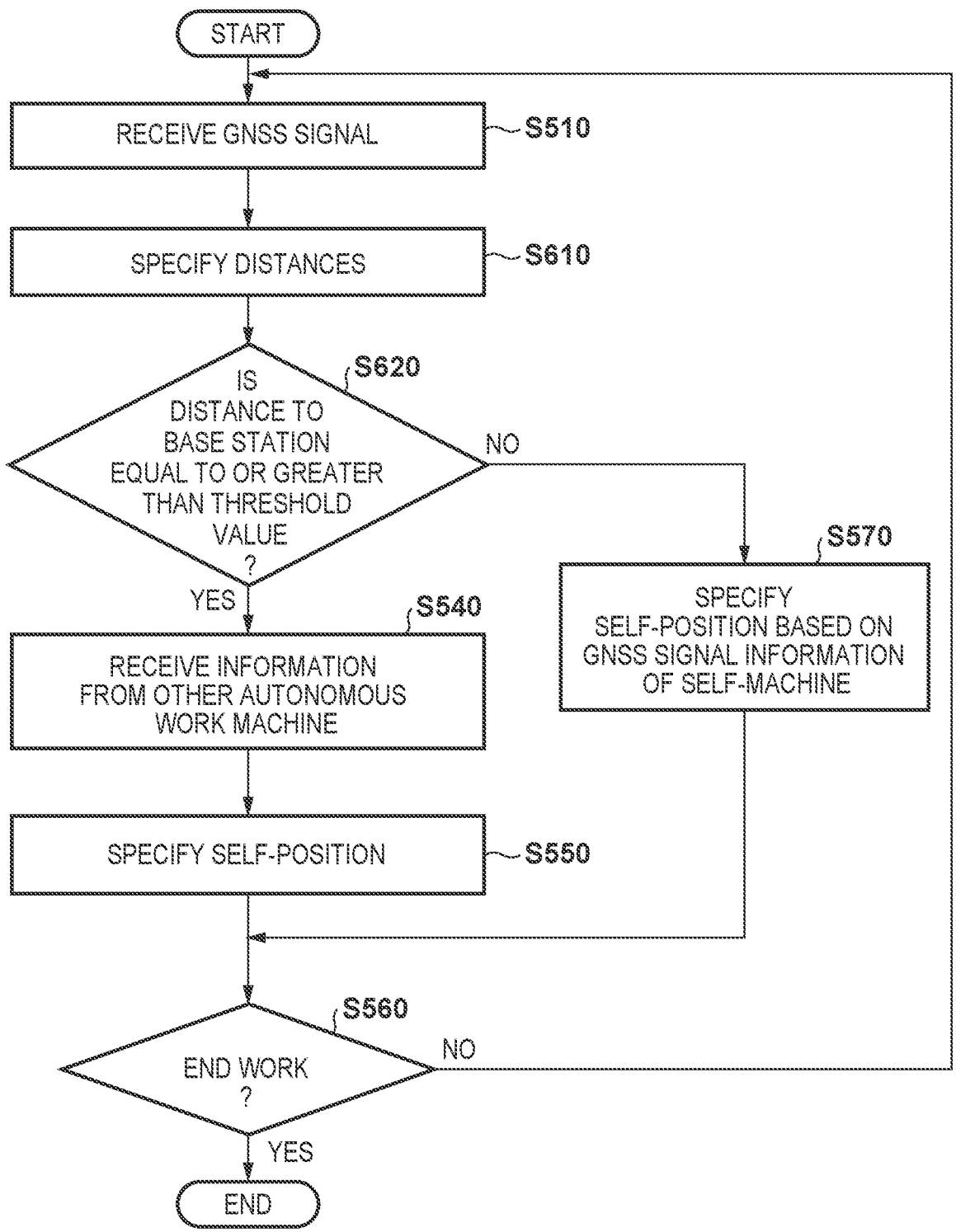
FIG. 6 is a flowchart for describing a process of the autonomous work system according to a second embodiment.

FIG. 6 is a flowchart for describing a process of the autonomous work system according to a second embodiment. Processes of S610 and S620 are different from those in FIG. 5, but the other processes are similar to those in FIG. 5. Processes similar to those in FIG. 5 are denoted by the same step numbers.

In S610 of FIG. 6, the distance specifying unit C1 specifies the distance to the base station, based on the image information imaged by the camera 11. For example, in FIG. 4, the distance specifying unit C1 of the autonomous work machine 10E specifies the distances to the base stations (for example, RTK1 to RTK4), based on the image information imaged by the camera 11.

In step S620, the distance specifying unit C1 determines whether the distance between the autonomous work machine 10 and the base station is equal to or greater than a threshold value. In a case where the distance between the autonomous work machine 10 and the base station is smaller than the threshold value (S620—No), the position specifying unit C3 specifies the self-position based on the GNSS signal information that has been acquired from the received GNSS signal of the self-machine (S570).

On the other hand, in a case where the distance between the autonomous work machine 10 and the base station is equal to or greater than the threshold value in the determination process of step S620 (S620—Yes), the processes of step S540 and subsequent steps are performed.

Third Embodiment

In the process of FIG. 5, the description has been given with regard to an example in which the process is performed in accordance with the determination result as to whether the GNSS signal information that has been acquired based on the GNSS signal satisfies the allowable accuracy of the reference signal information. However, the process can also be performed in accordance with the determination result as to whether the autonomous work machine 10 (self-machine) has entered a specific area in which the GNSS signal information does not satisfy the predetermined allowable accuracy of the reference signal information.

Figure 7:
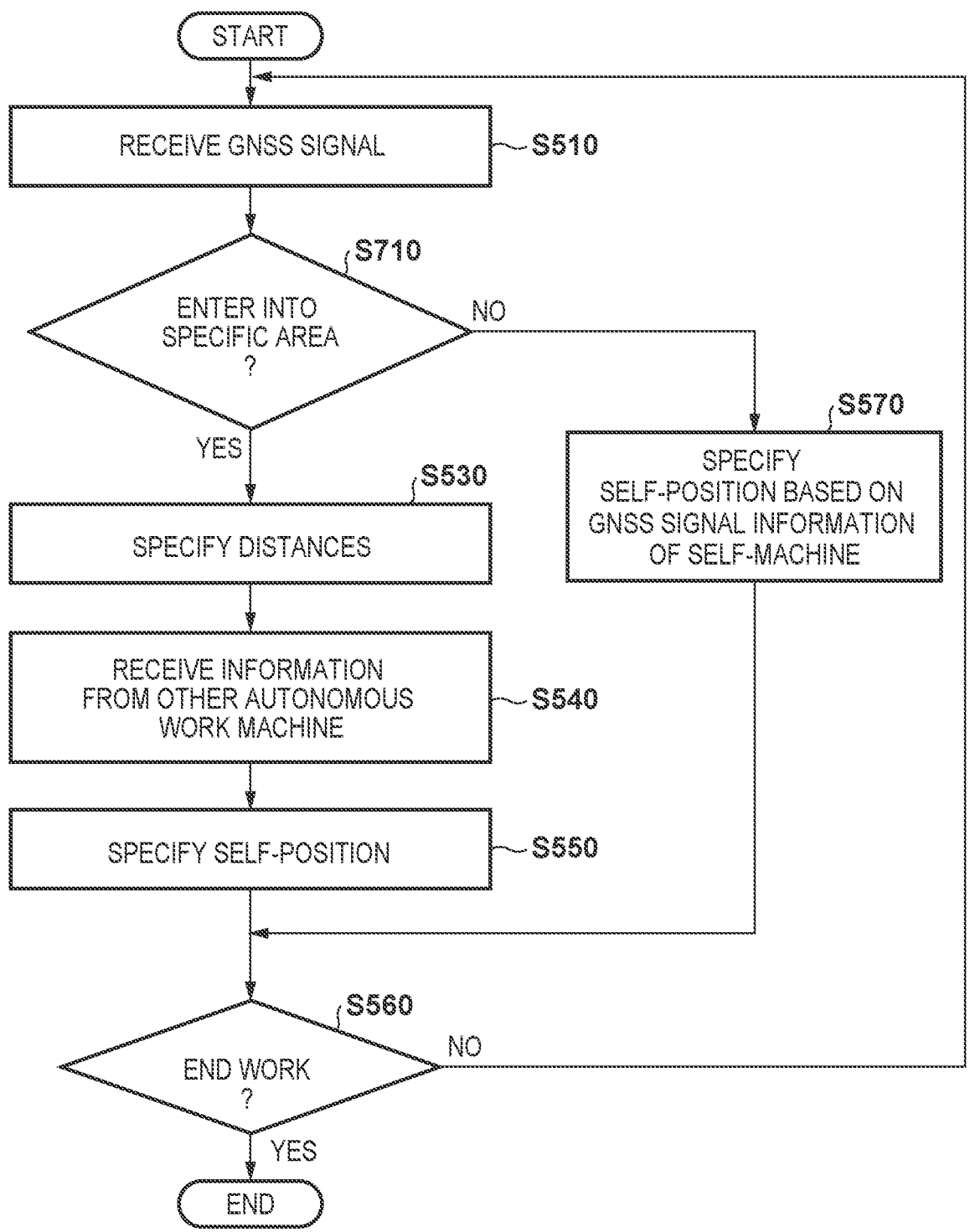
FIG. 7 is a flowchart for describing a process of the autonomous work system according to a third embodiment.

FIG. 7 is a flowchart for describing a process of the autonomous work system according to a third embodiment. A process of S710 is different from those in FIG. 5, but the other processes are similar to those in FIG. 5. Processes similar to those in FIG. 5 are denoted by the same step numbers.

In S710 of FIG. 7, the position specifying unit C3 compares the self-position of the autonomous work machine 10 that has been specified with the position information of the specific area that is set as the self-work area. The position specifying unit C3 refers to the memory 44c (the storage unit) (FIG. 8) to acquire the position information of the specific area that is set as the self-work area, and compares the position information of the specific area that has been acquired with the self-position of the autonomous work machine 10.

In a case where the self-position of the autonomous work machine 10 is located outside the specific area (S710—No), the position specifying unit C3 specifies the self-position based on the GNSS signal information that has been acquired from the received GNSS signal of the self-machine (S570).

On the other hand, in the determination process of step S710, in a case where the self-position of the autonomous work machine 10 is located inside the specific area, the position specifying unit C3 determines that the autonomous work machine 10 (self-machine) has entered the specific area (S710—Yes), and performs the processes of step S530 and subsequent steps.

Fourth Embodiment

In the schematic diagram of FIG. 4 illustrating a plurality of autonomous work machines that respectively perform the work in different work areas, in a case where markers are installed, for example, markers MK1 to MK4 that partition the boundary of the self-work area AR5 are installed. As the markers MK1 to MK4, for example, installation objects each having a predetermined height such as a pole or a triangular cone are arranged. Markers respectively having different appearances can be arranged for every arrangement position.

The distance specifying unit C1 partitions the boundary of the self-work area, and specifies a marker distance to the marker at which the position information in the self-work area is set. By imaging the markers MK1 to MK4 with the camera 11, the position specifying unit C3 is capable of acquiring information regarding distances (marker distances) from the autonomous work machine 10 (self-machine) to the respective markers MK1 to MK4 and directions of the autonomous work machine 10E with respect to the respective markers MK1 to MK4, based on the captured images.

In specifying the self-position, without using the information of the two other autonomous work machines 10, it is possible to use, for example, another autonomous work machine 10 (for example, the autonomous work machine 10A), the distance to such another autonomous work machine 10A, and the distance (the marker distance) to the marker (at least one of the markers MK1 to MK4) at which the position information in the self-work area AR5 is set. That is, the position specifying unit C3 is capable of specifying the self-position, based on the position information that has been received from another autonomous work machine 10A, the distance to such another autonomous work machine 10A, the position information of the marker (for example, MK2), and the marker distance.

Here, in a case where a detection unit (the magnetic sensor 66, the camera 11) detects an area wire or a marker that partitions the boundary of the self-work area, and the autonomous work machine that works in the self-work area approaches the area wire or the marker by a predetermined distance, the position specifying unit C3 is capable of specifying the self-position based on a combination of a reception result of the GNSS signal information and a detection result of the area wire or the marker, and is capable of determining a turning timing in the autonomous traveling.

Other Embodiments

In addition, a program for realizing each function of the autonomous work machine that has been described in the embodiments can be supplied to the autonomous work machine through a network or a storage medium, and one or more processors in a computer of the autonomous work machine are capable of reading and executing the program.

Summary of Embodiments

Configuration 1. The autonomous work system in the above embodiment is an autonomous work system (for example, STM of FIG. 1) including a plurality of autonomous work machines (for example, 10 of FIG. 1), the plurality of autonomous work machines (10) each including:

a distance specifying unit (for example, C1 of FIG. 3) configured to specify a distance to another autonomous work machine based on image information obtained by imaging surroundings; and a communication unit (for example, C2 of FIG. 3) configured to receive a GNSS signal of a self-machine, and GNSS signal information that has been acquired based on a GNSS signal that has been received by the another autonomous work machine and position information of the another autonomous work machine that has been acquired based on the GNSS signal information; and a position specifying unit (for example, C3 of FIG. 3) configured to, in a case where the GNSS signal information that has been acquired based on the GNSS signal of the self-machine does not satisfy predetermined allowable accuracy of reference signal information, specify a self-position in a self-work area, based on the position information of the another autonomous work machine that has received the GNSS signal having the GNSS signal information that satisfies the allowable accuracy of the reference signal information and a distance to the another autonomous work machine.

According to the autonomous work system in Configuration 1, in the case where the GNSS signal information that has been acquired based on the GNSS signal received by the self-machine does not satisfy the predetermined allowable accuracy of the reference signal information, it is possible to specify the self-position, based on the position information of another autonomous work machine that has received the GNSS signal having the GNSS signal information that satisfies the allowable accuracy and the distance to such another autonomous work machine.

Configuration 2. In the autonomous work system (STM) in the above embodiment, a storage unit (44c of FIG. 3) configured to store a specific area in which the GNSS signal information does not satisfy the predetermined allowable accuracy of the reference signal information is further included in each work area, and when the self-machine enters the specific area in the self-work area, the position specifying unit (C3) specifies the self-position based on the position information of the another autonomous work machine and the distance to the another autonomous work machine.

According to the autonomous work system in Configuration 2, even when a shielding object that shields a radio wave exists or the self-machine enters a specific area where it is difficult to stably receive a GNSS signal due to a relative positional relationship with a base station, it is possible to specify the self-position in the self-work area based on the position information of another autonomous work machine that has received the GNSS signal having the GNSS signal information that satisfies the allowable accuracy of the reference signal information and the distance to such another autonomous work machine.

Configuration 3. In the autonomous work system (STM) in the above embodiment, the position specifying unit (C3) specifies the self-position, based on the position information that has been received from at least two other autonomous work machines and distances to the at least two other autonomous work machines.

According to the autonomous work system in Configuration 3, it is possible to specify the self-position in the self-work area, based on the triangulation based on the position information that has been received from at least two other autonomous work machines and the distance to such at least two other autonomous work machines.

Configuration 4. In the autonomous work system (STM) in the above embodiment, the distance specifying unit (C1) further specifies a marker distance to a marker at which a boundary of the self-work area is partitioned and position information in the self-work area is set, based on the image information, and the position specifying unit (C3) specifies the self-position, based on the position information that has been received from the another autonomous work machine, the distance to the another autonomous work machine, the position information of the marker, and the marker distance.

According to the autonomous work system in Configuration 4, it is possible to specify the self-position in the self-work area, based on the position information that has been received from another autonomous work machine, the distance to such another autonomous work machine, and the triangulation based on the position information of the marker and the marker distance.

Configuration 5. In the autonomous work system (STM) in the above embodiment, a work area (for example, AR1 to AR4 of FIG. 4) in which the another autonomous work machine performs work is a work area located closer to a base station (RTK1 to RTK4) for transmitting the GNSS signal than the self-work area (for example, AR5 of FIG. 4).

According to the autonomous work system in Configuration 5, another autonomous work machine that works in a work area located closer to the base station than the self-work area is capable of receiving the GNSS signal in a more stable state. Even in a case where the GNSS signal information that has been acquired based on the GNSS signal that has been received by the self-machine does not satisfy the predetermined allowable accuracy of the reference signal information, it is possible to specify the self-position in the self-work area, based on the position information of another autonomous work machine that has received the GNSS signal that satisfies the allowable accuracy of the reference signal information and the distance to such another autonomous work machine.

Configuration 6. In the autonomous work system (STM) in the above embodiment, in a case where a distance to the base station is equal to or greater than a threshold distance, based on the image information that has been acquired by the distance specifying unit (C1), the position specifying unit (C3) specifies the self-position, based on the position information of the another autonomous work machine and the distance to the another autonomous work machine.

According to the autonomous work system in Configuration 6, even in a case where the self-machine performs work at a position where it is difficult to stably receive the GNSS signal due to the relative positional relationship with the base station, it is possible to specify the self-position in the self-work area, based on the position information of another autonomous work machine that has received the GNSS signal having the GNSS signal information that satisfies the allowable accuracy of the reference signal information and the distance to such another autonomous work machine.

Configuration 7. In the autonomous work system (STM) in the above embodiment, in a case where in the self-work area, the GNSS signal information that has been acquired based on the GNSS signal of the self-machine satisfies the allowable accuracy of the reference signal information, the position specifying unit (C3) specifies the self-position based on the GNSS signal information.

According to the autonomous work system in Configuration 7, in the case where the GNSS signal information of the self-machine satisfies the allowable accuracy of the reference signal information, it is possible to specify the self-position, based on the GNSS signal information of the self-machine without using the position information of another autonomous work machine or the information of the distance to such another autonomous work machine.

Configuration 8. In the autonomous work system (STM) in the above embodiment, the plurality of autonomous work machines respectively performs work in different work areas.

According to the autonomous work system in Configuration 8, in each of the plurality of autonomous work machines, in a case where the GNSS signal information that has been acquired based on the GNSS signal that has been received by the self-machine does not satisfy the predetermined allowable accuracy of the reference signal information, it is possible to specify the self-position, based on the position information of another autonomous work machine that has received the GNSS signal having the GNSS signal information that satisfies the allowable accuracy and the distance to such another autonomous work machine.

The present invention is not limited to the above embodiments, and thus various modifications and changes may be made within the scope of the gist of the present invention.

What is claimed is:

1. An autonomous work system comprising a plurality of autonomous work machines, the plurality of autonomous work machines each comprising:
    at least one processor circuit with a memory comprising instructions, that when executed by the at least one processor circuit, causes the at least one processor circuit to at least:
        specify a distance to another autonomous work machine based on image information obtained by imaging surroundings;
        receive a GNSS signal of a self-machine, GNSS signal information that has been acquired based on a GNSS signal that has been received by the another autonomous work machine, and position information of the another autonomous work machine that has been acquired based on the GNSS signal information;
        specify, based on the image information, a marker distance to a marker at which a boundary of a self-work area is defined and position information in the self-work area is set;
        in a case where GNSS signal information that has been acquired based on the GNSS signal of the self-machine does not satisfy predetermined allowable accuracy of reference signal information, specify a self-position in the self-work area based on the position information of the another autonomous work machine that has received the GNSS signal having the GNSS signal information that satisfies the allowable accuracy of the reference signal information, the distance to the another autonomous work machine, the position information of the marker, and the marker distance; and
        determine a turning timing in an autonomous traveling based on a combination of the position information of the another autonomous work machine and the marker distance.

2. The autonomous work system according to claim 1, wherein the instructions, when executed by the at least one processor circuit, further cause the at least one processor circuit to at least:
    store a specific area in which the GNSS signal information that has been acquired based on the GNSS signal of the self-machine does not satisfy the allowable accuracy of the reference signal information in each work area;
    specify the self-position based on the position information of the another autonomous work machine and the distance to the another autonomous work machine, further in a case when the self-machine enters the specific area in the self-work area.

3. The autonomous work system according to claim 1, wherein the instructions, when executed by the at least one processor circuit, further cause the at least one processor circuit to at least specify the self-position based on position information that has been received from at least two other autonomous work machines including the another autonomous work machine and distances to the at least two other autonomous work machines.

4. The autonomous work system according to claim 1, wherein a work area in which the another autonomous work machine performs work is a work area located closer to a base station for transmitting the GNSS signal than the self-work area.

5. The autonomous work system according to claim 4, wherein further in a case where a distance between the self-machine and the base station is equal to or greater than a threshold distance, based on the image information that has been acquired, the instructions, when executed by the at least one processor circuit, further cause the at least one processor circuit to at least specify the self-position based on the position information of the another autonomous work machine and the distance to the another autonomous work machine.

6. The autonomous work system according to claim 1, wherein in a case where in the self-work area, the GNSS signal information that has been acquired based on the GNSS signal of the self-machine satisfies the allowable accuracy of the reference signal information, the instructions, when executed by the at least one processor circuit, further cause the at least one processor circuit to at least specify the self-position based on the GNSS signal information that has been acquired based on the GNSS signal of the self-machine.

7. The autonomous work system according to claim 1, wherein the plurality of autonomous work machines respectively perform work in different work areas.

* * * * *